US009738239B2

(12) United States Patent
Beau et al.

(10) Patent No.: US 9,738,239 B2
(45) Date of Patent: Aug. 22, 2017

(54) TRIM ASSEMBLY FOR A VEHICLE PASSENGER COMPARTMENT AND CORRESPONDING VEHICLE

(71) Applicant: Faurecia Interieur Industrie, Nanterre (FR)

(72) Inventors: Godefroy Beau, La Garenne Colombes (FR); Jean-François Oeuvrard, Cergy Pontoise (FR)

(73) Assignee: Faurecia Interieur Industrie, Nanterre (FR)

( * ) Notice: Subject to any disclaimer, the term of this patent is extended or adjusted under 35 U.S.C. 154(b) by 429 days.

(21) Appl. No.: 14/303,320

(22) Filed: Jun. 12, 2014

(65) Prior Publication Data

US 2014/0370797 A1    Dec. 18, 2014

(30) Foreign Application Priority Data

Jun. 12, 2013   (FR) ..................... 13 55446

(51) Int. Cl.
| | | |
|---|---|---|
| *B60H 1/34* | (2006.01) | |
| *B60H 1/24* | (2006.01) | |
| *B60R 13/02* | (2006.01) | |
| *B62D 25/14* | (2006.01) | |
| *B60H 1/00* | (2006.01) | |

(52) U.S. Cl.
CPC ....... *B60R 13/0256* (2013.01); *B60H 1/0055* (2013.01); *B60H 1/242* (2013.01); *B60H 1/3414* (2013.01); *B62D 25/142* (2013.01); *B60K 2350/401* (2013.01)

(58) Field of Classification Search
CPC  B60R 13/0256; B60H 1/3435; B60H 1/0055; B60H 1/242; B60H 1/3414; B60H 2001/00185; B60H 2001/003; B62D 25/142; B60K 2350/401; B60K 13/06; B60K 37/04

USPC ........ 454/152, 155, 139, 333; 137/7, 2, 353, 137/808, 829

IPC .......................... B60R 13/02; B60H 1/34,1/24

See application file for complete search history.

(56) References Cited

U.S. PATENT DOCUMENTS

| | | | | |
|---|---|---|---|---|
| 2,237,477 A | * | 4/1941 | Colvin ............... | B60H 1/00042 165/126 |
| 2,796,820 A | * | 6/1957 | Moore .................. | B60H 1/242 165/43 |
| 3,766,843 A | | 10/1973 | Grier | |

(Continued)

FOREIGN PATENT DOCUMENTS

| | | |
|---|---|---|
| DE | 4334535 C1 | 9/1994 |
| EP | 1920955 A1 | 5/2008 |

(Continued)

OTHER PUBLICATIONS

French Search Report for application No. FR 1355446, dated Mar. 19, 2014, 3 pages.

*Primary Examiner* — Gregory Huson
*Assistant Examiner* — Daniel E Namay
(74) *Attorney, Agent, or Firm* — Reising Ethington P.C.

(57) ABSTRACT

A trim assembly having a trim element and an air vent designed to be supplied with air. The trim element includes a first face designed to be oriented toward a user, a second face opposite the first face, and an edge extending between the first face and the second face. The air vent is positioned to generate a jet of air flowing along the second face toward the edge.

21 Claims, 3 Drawing Sheets

(56) References Cited

U.S. PATENT DOCUMENTS

| | | | | |
|---|---|---|---|---|
| 5,836,813 A * | 11/1998 | Miyata | ............... | B60H 1/00685 |
| | | | | 181/225 |
| 6,089,971 A * | 7/2000 | Jokela | ................... | B60H 1/242 |
| | | | | 454/127 |
| 6,530,832 B2 * | 3/2003 | Elliot | ................... | B60H 1/3407 |
| | | | | 454/127 |
| 6,902,474 B2 * | 6/2005 | Gehring | ............... | B60H 1/3414 |
| | | | | 454/152 |
| 8,157,627 B2 * | 4/2012 | Stefani | ................. | B60H 1/0055 |
| | | | | 454/121 |
| 8,292,704 B2 * | 10/2012 | Storgato | ............. | B60H 1/00835 |
| | | | | 454/121 |
| 2001/0021634 A1 * | 9/2001 | Elliot | ................... | B60H 1/242 |
| | | | | 454/121 |
| 2006/0172677 A1 * | 8/2006 | Ryu | ................... | B60H 1/00871 |
| | | | | 454/152 |
| 2006/0217054 A1 * | 9/2006 | Hoehn | ................... | B60H 1/242 |
| | | | | 454/127 |
| 2007/0128999 A1 * | 6/2007 | Komowski | ........ | B60H 1/00685 |
| | | | | 454/155 |
| 2009/0298411 A1 * | 12/2009 | Stefani | ................. | B60H 1/0055 |
| | | | | 454/152 |
| 2010/0014959 A1 * | 1/2010 | Azzouz | ............... | B60H 1/3435 |
| | | | | 415/126 |
| 2010/0210202 A1 * | 8/2010 | Kakizaki | ............ | B60H 1/00064 |
| | | | | 454/121 |
| 2014/0054388 A1 * | 2/2014 | Heilemann | ........ | B60H 1/00028 |
| | | | | 237/28 |

FOREIGN PATENT DOCUMENTS

| | | | |
|---|---|---|---|
| JP | 04273945 A | * | 9/1992 |
| JP | 2004026038 | | 1/2004 |

* cited by examiner

TRIM ASSEMBLY FOR A VEHICLE PASSENGER COMPARTMENT AND CORRESPONDING VEHICLE

TECHNICAL FIELD

The present invention relates to the field of vehicle passenger compartment trim, in particular for motor vehicles.

BACKGROUND

Motor vehicles generally comprise air vents emerging in the passenger compartment and supplied with air heated or cooled by an air conditioning unit. Air vents are generally positioned on a dashboard, which also receives man-machine interfaces (screen, control buttons, etc.) allowing the passengers, in particular the driver, to command the functional members of the vehicle (onboard computer, air conditioning unit, car radio, satellite navigation system, etc.).

Builders wish to be able to offer man-machine interfaces with a considerable size, which in particular make them easier for the driver to read and use.

The ergonomic installation of air vents and man-machine interfaces in a reduced space poses difficulties.

SUMMARY

One of the aims of the invention is to provide a trim assembly for a motor vehicle that makes it possible to facilitate the installation of air vents, in particular close to man-machine interfaces.

To that end, the invention in at least some embodiments is directed to a vehicle passenger compartment trim assembly, comprising a trim element and an air vent intended to be supplied with air, in which the trim element comprises a first face designed to be oriented toward a user, a second face opposite the first face, and an intermediate edge extending between the first face and the second face, in which the air vent is positioned to generate a jet of air flowing along the second face toward the intermediate edge.

According to specific embodiments, the trim unit comprises one or more of the following features, considered alone or according to any technically possible combinations:
- the trim element has a deflector positioned along the intermediate edge, the deflector having a profiled guide surface to deflect the jet of air toward the user;
- the guide surface forms a marginal portion of the second face adjacent to the intermediate edge;
- the guide surface is convex;
- the guide surface is flush with the intermediate edge;
- the guide surface and the first face converge toward one another toward the intermediate edge;
- the deflector pivots relative to the intermediate edge;
- the deflector is movable between a retracted position for minimal deflection of the jet of air and a deployed position for maximal deflection of the jet of air;
- the trim element comprises a fin secured to the deflector, the guide surface and the fin defining a passage between them for the jet of air;
- the passage converges toward the intermediate edge; and
- the trim element comprises at least one man-machine interface positioned on its first face.

The invention also relates to a motor vehicle comprising a trim assembly as defined above.

BRIEF DESCRIPTION OF THE DRAWINGS

The invention and its advantages will be better understood upon reading the following description, provided solely as an example and done in reference to the appended drawings, in which.

DETAILED DESCRIPTION OF THE ILLUSTRATED EMBODIMENT(S)

Figure 1:
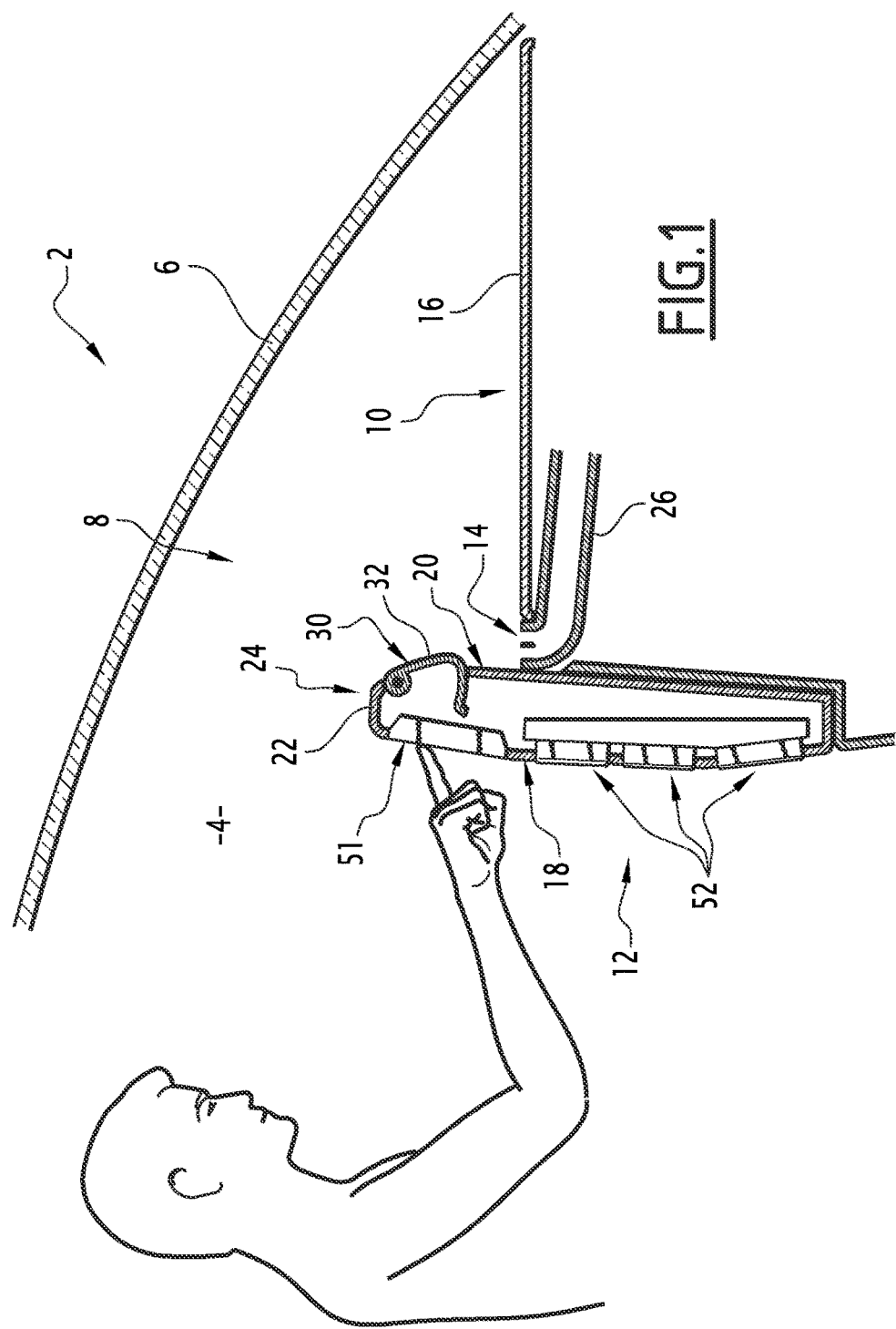
FIG. 1 is a partial diagrammatic view of a motor vehicle passenger compartment comprising a trim assembly.

The motor vehicle 2 illustrated in FIG. 1 comprises a passenger compartment 4, a windshield 6 and a trim assembly 8.

The trim assembly 8 is positioned in the passenger compartment 4. It comprises a dashboard 10, a trim element 12 and an air vent 14.

The dashboard 10 comprises an upper surface 16.

The trim element 12 is attached on the dashboard 10.

The trim element 12 has a first face 18 designed to be turned toward the users, in particular the driver, and a second face 20 opposite the first face 18 and designed to be turned opposite the users, in particular the driver, and a free intermediate edge 22 extending between the first face 18 and the second face 20.

The first face 18 extends substantially vertically. The intermediate edge 22 is an upper edge of the trim element 12.

The first face 18 and the second face 20 are oriented substantially opposite one another. The first face 18 is oriented toward the rear of the vehicle 2. The second face 20 is substantially vertical and oriented toward the front of the vehicle 2. The first face 18 and the second face 20 are substantially parallel.

The trim element 12 is positioned at one end of the upper surface 16 of the dashboard 10 opposite the windshield 6. The trim element 12 comprises an upper part 24 upwardly overhanging relative to the upper surface 16 of the dashboard 10.

The air vent 14 is supplied with air by a ventilation duct 26. In a manner known in itself, the ventilation duct 26 is supplied with air heated and/or cooled by an air conditioning unit (not shown).

Figure 2:
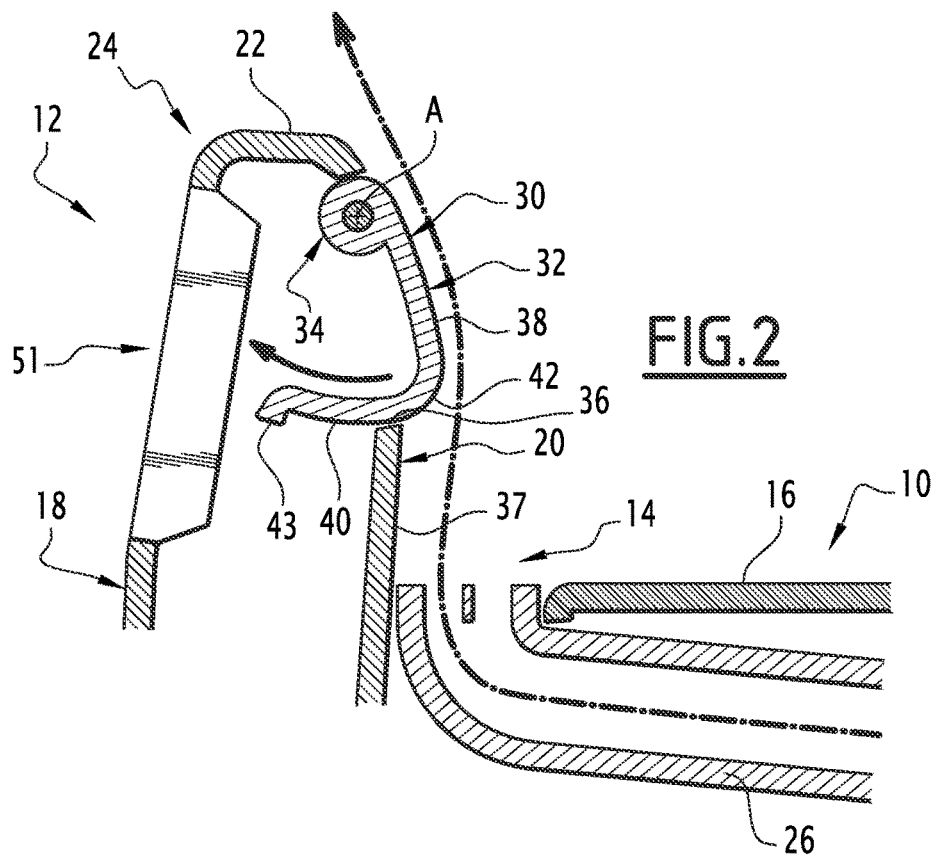
FIGS. 2 and 3 are detailed views of the trim assembly in two different configurations.
Figure 3:
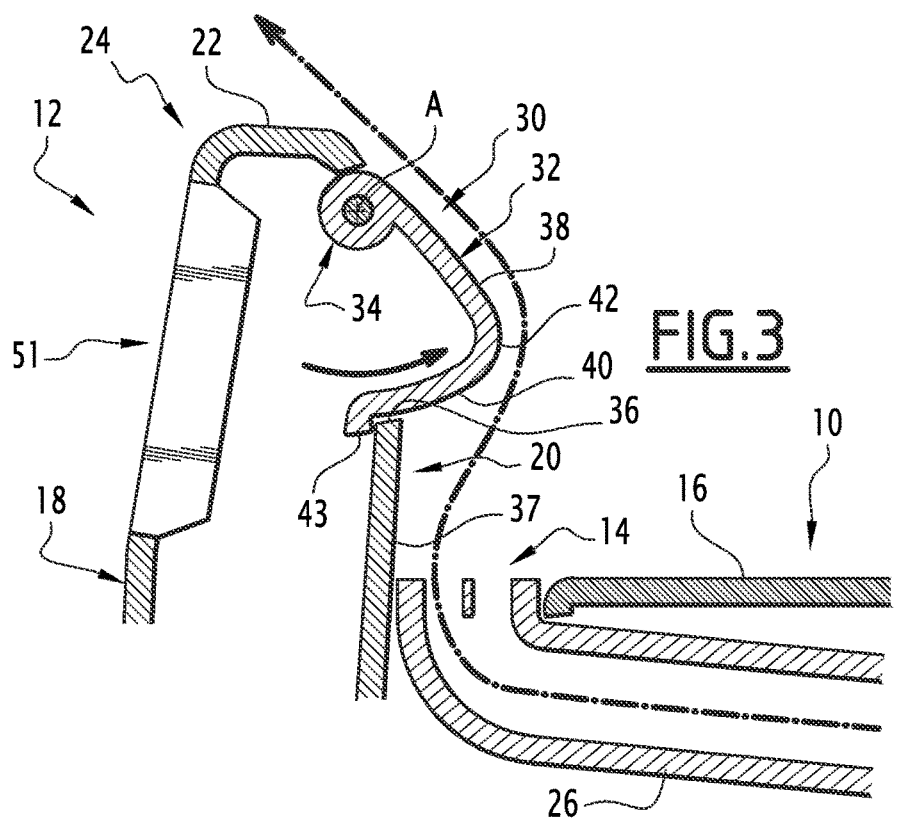

As illustrated in FIGS. 2 and 3, the air vent 14 emerges in the passenger compartment 4, along the second face 20, at a distance from the intermediate edge 22. The air vent 14 is arranged to generate an air jet circulating along the second face 20 of the trim element 12, toward the intermediate edge 22. The air jet leaving the air vent 14 is oriented substantially vertically upward. The air vent 14 is positioned at the junction between the upper surface 16 of the dashboard 10 and the second face 20 of the trim element 12.

The air vent 14 emerges in the passenger compartment before the trim element 12. The trim element 12 is thus interposed between the air vent 14 and the passengers of the vehicle 2.

The second face 20 is free near the intermediate edge 22, between the air vent 14 and the intermediate edge 22. The trim assembly 2 is provided with a channel duct along the second face 20, between the air vent 14 and the intermediate edge 22. The first face 18 is also free, preferably completely free.

The trim element 12 comprises a deflector 30 positioned on the second face 20, along the intermediate upper edge 22. The deflector 30 is positioned so as to deflect the direction of the jet of air reaching the intermediate edge 22.

The deflector 30 is separate from the air vent 14. The deflector 30 is remote from the air vent 14. The deflector 30 is a moving element separate from the air vent 14 and spaced away from the air vent 14. The air vent 14 is positioned at the terminal end of the ventilation duct 26 supplying the passenger compartment with air. The jet of air emerges in the passenger compartment through the air vent 14. The deflector 30 is provided to deflect the jet of air after the jet of air has been ejected by the air vent 14. After having left the air vent 14, the air jet flows along the second surface 20 before reaching the deflector 30 and being deflected by it.

The deflector 30 has a profiled guide surface 32 to deflect the air jet passing over the deflector 30. The guide surface 32 forms the marginal portion of the second face 20 adjacent to the intermediate edge 22.

The guide surface 32 is turned opposite the first face 18. The guide surface 32 is convex and curved opposite the first face 18. The guide surface 32 rejoins the intermediate edge 22 while being flush with it. Only the guide surface 32 of the deflector 30 is exposed to the air jet.

The deflector 30 is mounted pivoting relative to the intermediate edge 22 to modify the direction of the air jet reaching the intermediate edge 22 as a function of the angular position of the deflector 30.

The deflector 30 is mounted pivoting around an axis of rotation A by means of a hinge 34. The hinge 34 extends along the intermediate edge 22. The axis of rotation A here is substantially horizontal.

The deflector 30 is received in an opening 36 delimited between the intermediate edge 22 and a stationary surface 37 of the second face 20 spaced away from the intermediate edge 22. The guide surface 32 extends the stationary surface 37 as far as the intermediate edge 22.

The deflector 30 pivots between a retracted position (FIG. 2) for minimal deflection of the air jet, in which the deflector 30 is refracted into the opening 36, and a deployed position (FIG. 3) for maximal deflection of the jet of air, in which the deflector 30 is deployed outside the opening 36.

The guide surface 32 comprises a downstream portion 38 and an upstream portion 40. The downstream portion 38 is adjacent to the intermediate edge 22 and the upstream portion 40 is adjacent to the air vent 14. The air jet circulates along the guide surface 32 from the upstream portion 40 toward the downstream portion 38.

The downstream portion 38 extends substantially radially relative to the axis of rotation A. The downstream portion 38 rejoins the intermediate edge 22 while being flush with it.

The upstream portion 40 extends the downstream portion 38 opposite the intermediate edge 22. The upstream portion 40 extends substantially in an arc of circle around the axis of rotation A, toward the first face 18 from the downstream portion 38.

The guide surface 32 comprises a convex rounded portion 42 at the junction between the front portion 38 and the upstream portion 40. The rounded portion 42 has a curve radius smaller than that of the upstream portion 40.

At the end of the upstream portion 40 opposite the downstream portion 38, the deflector 30 has a rim 43 to limit the movement of the deflector 30 in the deployment direction.

In the retracted position (FIG. 2), the upstream portion 40 is retracted into the opening 36. In the deployed position (FIG. 3), the upstream portion 40 is deployed outside the opening 36.

The guide surface 32 forms, on the second face 20, along the intermediate edge 22, a profiled boss moving away from the second face 20, then coming closer to the second face 20 while traveling along it from the air vent 14 toward the intermediate edge 22.

The downstream portion 38 extends between the apex of the boss, formed by the rounded portion 42, and the intermediate edge 22, and the upstream portion 40 extends between the apex of the boss and the stationary surface 37.

The guide surface 32 of the deflector 30 in the deployed position (FIG. 3) and the first face 18 converge toward one another for the intermediate edge 22. More specifically, the downstream portion 38 and the first face 18 converge toward one another toward the intermediate edge 22.

In the illustrated example, the guide surface 32 of the deflector 30 in the retracted position (FIG. 2) also converges with the first face 18, but with a smaller angle between the downstream portion 38 and the first face 18 near the intermediate edge 22.

By the Coandă effect, the air jet tends to adhere to the guide surface 32 and follow the curvature of the guide surface 32. The air jet tends to follow the profile of the boss formed by the guide surface 32. Thus, the air jet moves away from the second face 20 along the upstream portion 40, then goes back down the boss toward the intermediate edge 22, along the downstream portion 38, in the direction of the downstream portion 38 that is inclined relative to the second face 20.

The air jet tends to detach from the trim element 12 from the intermediate upper edge 22. The direction of the air jet from the intermediate edge 22 depends on its direction when it reaches the intermediate edge 22.

In the retracted position (FIG. 2), the air jet reaches the intermediate edge 22 while being oriented upward. The deflector 30 in the retracted position deflects the air jet little, which is thus oriented upward from the intermediate edge 22, for example toward the windshield 6 or the upper part of the passenger compartment 4.

In the deployed position (FIG. 3), the air jet is oriented in a direction closer to the horizontal than in the retracted position. The air jet generated on the side of the second face 20 is thus deflected by the guide surface 32 toward the side of the first face 18, toward the user.

The deflector 30 therefore makes it possible to deflect the air jet toward the user.

Due to its mobility, the deflector 30 makes it possible to adjust the direction of the air jet from the intermediate edge 22. Preferably, the deflector 30 is suitable for being immobilized in one or more angular positions between the retracted position (FIG. 2) for minimal deflection of the air jet and the deployed position (FIG. 3) for maximal deflection of the air jet.

The profiled, convex and curved shape of the guide surface 32 makes it possible to deflect the air jet while keeping the air jet attached to the guide surface 32 as far as the intermediate edge 22, in particular in the different positions of the deflector 30.

The arc of circle shape of the upstream portion 40 makes it possible to ensure continuity between the guide surface 32 and the stationary surface 37 in the different angular positions of the deflector 30 around the axis of rotation A.

Figure 4:
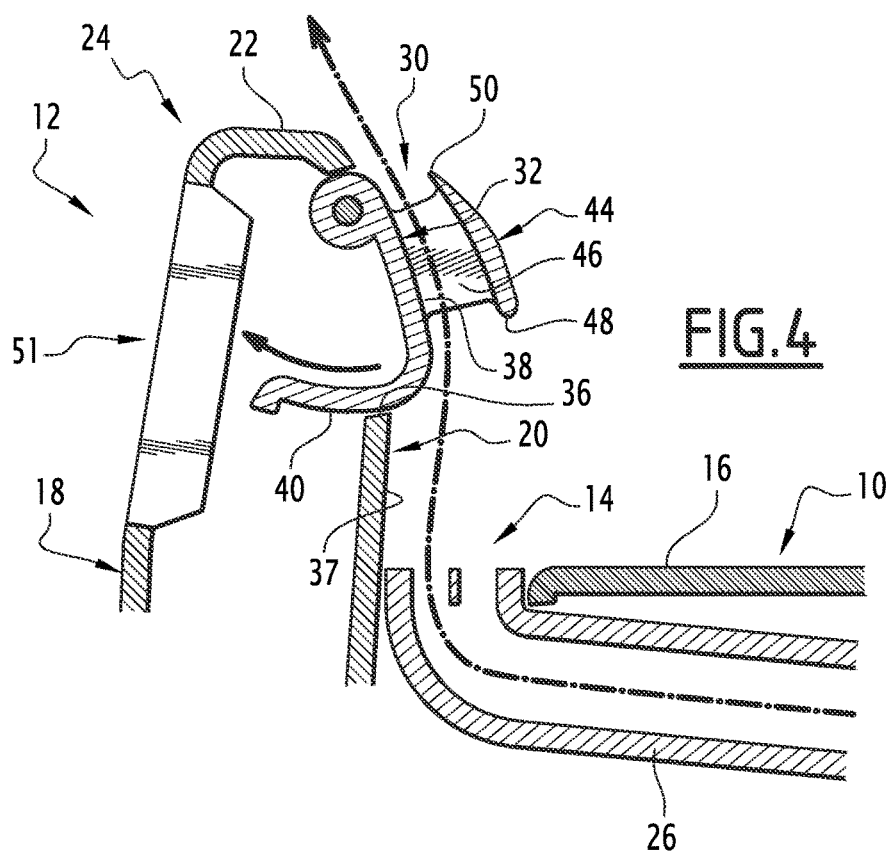
FIGS. 4 and 5 are views similar to those of FIGS. 2 and 3 and illustrating a trim assembly according to one alternative.
Figure 5:
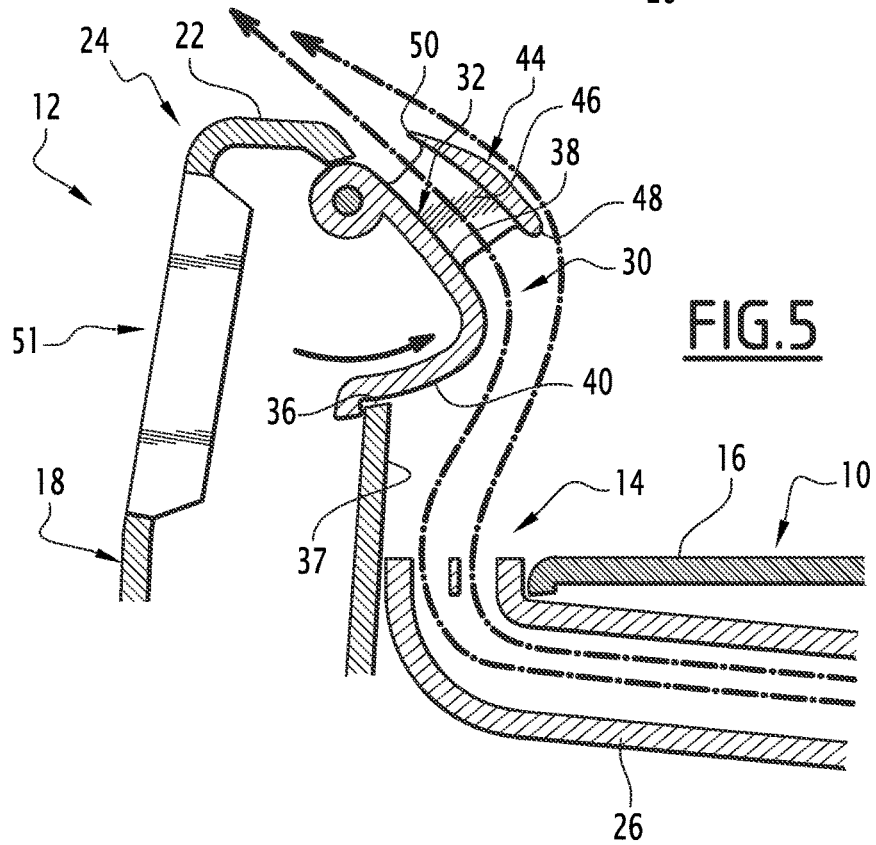

The embodiment of FIGS. 4 and 5 differs from that of FIGS. 2 and 3 in that the trim assembly 6 further comprises a fin 44 secured to the deflector 30.

The fin 44 is spaced away from the guide surface 32. It is positioned across from the downstream portion 38. The fin 44, together with the guide surface 32, defines a passage 46 for the air jet. The fin 44 divides the air jet in two, part of the air jet passing between the fin 44 and the guide surface 32, the other part of the air jet passing on the side of the fin 44 opposite the guide surface 32. The passage 46 emerges along the intermediate edge 22. The fin 44 has a thickness that progressively increases, then decreases from a rounded leading edge 48 adjacent to the air vent 14 toward a slender trailing edge 50 adjacent to the intermediate edge 22.

The fin 44 is configured to cause acceleration of the air flow circulating in the passage 46.

To that end, the passage 46 converges from its inlet toward its outlet. The air of the transverse section of the passage 46 decreases progressively from the inlet of the passage 46 adjacent to the air vent 14 toward the outlet of the passage 46 adjacent to the intermediate edge 22.

As illustrated in FIGS. 1 to 5, the trim element 12 comprises man-machine interfaces on its first face 18. On its first face 18, the trim element 12 in particular comprises a screen 51, preferably a touchscreen, and control panels 52. Each control panel 52 for example comprises a set of control buttons to control one or more functional members of the motor vehicle.

The foregoing embodiments make it is possible to have air vents masked behind a trim element while orienting the air jet toward the passengers by deflecting the air jet along a second free face of the trim element opposite the passengers. The air vents are alongside the trim element and are invisible to the passengers. The deflector positioned on the second face of the trim element is also not very visible. This makes it possible to increase the dimensions of the trim element, in particular in the case of a man-machine interface, while offering the possibility of installing air vents discreetly behind the trim element.

The invention claimed is:

1. A vehicle passenger compartment trim assembly, comprising a trim element and an air vent intended to be supplied with air, in which the trim element comprises a first face designed to be oriented toward a user, a second face opposite the first face, and an intermediate edge extending between the first face and the second face, wherein the air vent is positioned to generate a jet of air flowing along the second face toward the intermediate edge, wherein the trim element has a deflector positioned along the intermediate edge, wherein the deflector has a profiled guide surface to deflect the jet of air toward the user and the deflector is arranged to deflect the jet of air after the jet of air has been elected by the air vent.

2. The trim assembly according to claim 1, wherein the guide surface forms a marginal portion of the second face adjacent to the intermediate edge.

3. The trim assembly according to claim 1, wherein the guide surface is convex.

4. The trim assembly according to claim 1, wherein the guide surface is flush with the intermediate edge.

5. The trim assembly according to claim 1, wherein the guide surface and the first face converge toward one another toward the intermediate edge.

6. The trim assembly according to claim 1, wherein the deflector pivots relative to the edge.

7. The trim assembly according to claim 6, wherein the deflector is movable between a retracted position for minimal deflection of the jet of air and a deployed position for maximal deflection of the jet of air.

8. The trim assembly according to claim 1, wherein the trim element comprises a fin secured to the deflector, the guide surface and the fin defining a passage between them for the jet of air.

9. The trim assembly according to claim 8, wherein the passage converges toward the edge.

10. The trim assembly according to claim 1, wherein the deflector is positioned so as to deflect the direction of the jet of air reaching the intermediate edge.

11. The trim assembly according to claim 1, wherein the deflector has a guide surface for the jet of air that is profiled so as to ensure surface continuity with a stationary surface of the second face in the different positions of the deflector.

12. The trim assembly according to claim 1, wherein the trim element upwardly overhangs relative to the upper surface of a dashboard.

13. The trim assembly according to claim 1, wherein the trim element is positioned at one end of the upper surface of a dashboard of the vehicle opposite a windshield of the vehicle.

14. The trim assembly according to claim 1, wherein the trim element is attached on a dashboard.

15. The trim assembly according to claim 1, wherein the second face is free between the air vent and the deflector.

16. The trim assembly according to claim 1, wherein the first face extends substantially vertically.

17. The trim assembly according to claim 1, wherein the deflector is positioned so as to deflect the direction of the jet of air reaching the edge.

18. The trim assembly according to claim 1, wherein the deflector is separate from the air vent.

19. The trim assembly according to claim 1, wherein the deflector is remote from the air vent.

20. The trim assembly according to claim 1, wherein the trim element comprises at least one man-machine interface positioned on its first face.

21. A vehicle comprising a trim assembly according to claim 1.

* * * * *